June 3, 1930. W. McNEIL 1,761,485
AUTOMATIC DAMPER FOR VEHICLE SUSPENSION SPRINGS
Filed March 24, 1927 2 Sheets-Sheet 1
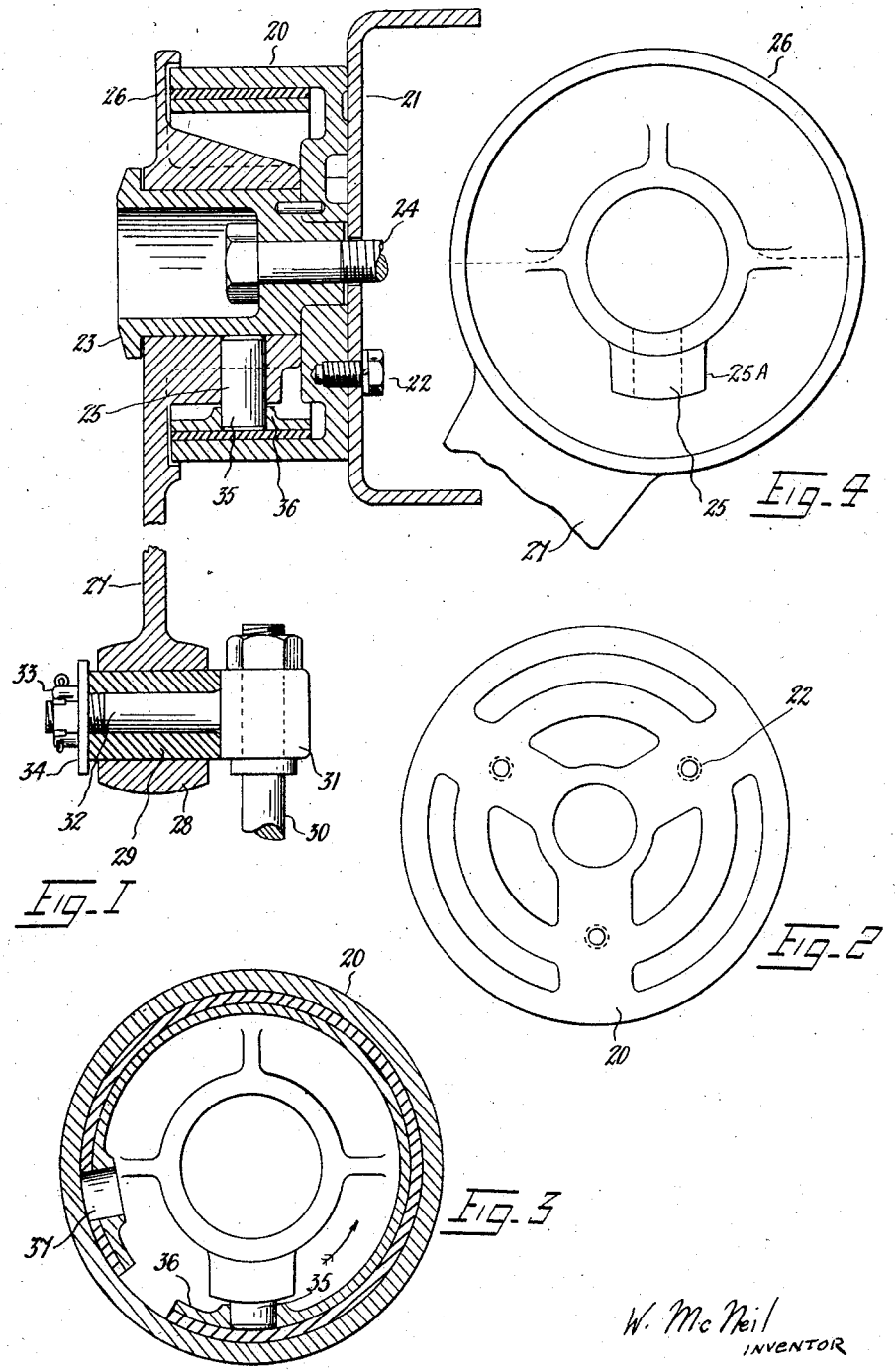

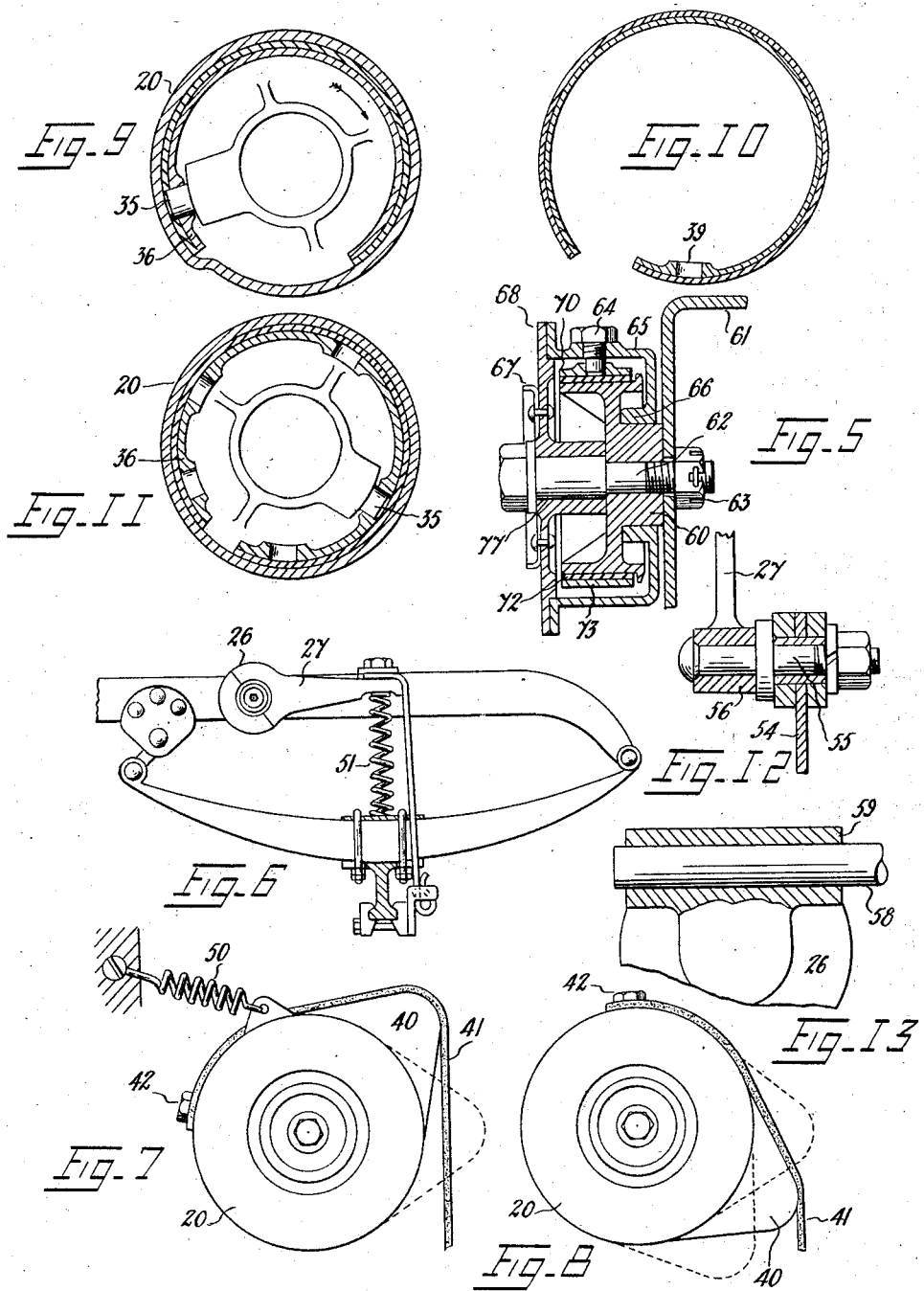

Patented June 3, 1930

1,761,485

UNITED STATES PATENT OFFICE

WILLIAM McNEIL, OF SYDNEY, NEW SOUTH WALES, AUSTRALIA

AUTOMATIC DAMPER FOR VEHICLE SUSPENSION SPRINGS

Application filed March 24, 1927, Serial No. 178,040, and in Australia April 30, 1926.

This invention consists in a novel type of spring damping device for suppressing oscillatory movements of vehicle suspension springs in the rebound movement, and if required also in the compression movement.

The device is broadly distinguished from known braking devices of the wrapping band type in the fact that whilst in those devices both ends of a braking band are controlled so that it is drawn taut upon the cooperating member, the spring shoe in this invention is floating in frictional contact with the drum surface and is controlled or operated at one point only, and is caused by movement relatively to the drum to clutch or grip the drum and bind itself more or less tightly during the full range of the operative relative movement.

In the accompanying drawings:—

Fig. 1 is a vertical section through the device showing the drum mounted on the chassis frame of a motor car and showing also a lever through which the suspension spring movements are transmitted to the shoe. In practice the lever would set in nearly horizontally when idle, but for the purpose of illustration it is best shown in the vertical position;

Fig. 2 is an elevational view of the back of the drum casting;

Fig. 3 is a sectional view showing the spring shoe cleaded with wire and asbestos fabric, and showing also the control arm which acts on the spring shoe;

Fig. 4 is an inside elevational view of a combined cover and control arm and lever;

Fig. 5 is a vertical section through the device, arranged with the spring shoe embracing the hub of the drum;

Fig. 6 is an elevational view indicating a method of rigging the device for controlling one of the fore suspension springs of a motor car;

Fig. 7 is a side elevational view indicating a method of fitting in which the drum cover has a flange humped on one side of it, and a control strap, which is connected to the suspension spring, brought over this hump. By adjusting the "zero" position of the drum the hump is appropriately utilized to vary the effective leverage between the suspension spring and the arm which controls the spring shoe;

Fig. 8 is a view similar to Fig. 7 showing the position of the parts in full extension, Fig. 7 showing them in the fully retracted (zero) position—that is when the suspension spring is fully flexed in compression;

Fig. 9 is a sectional view explanatory of the arrangement in which the drum is spiral in section instead of cylindrical as shown in other figures;

Fig. 10 is a sectional view of the spring shoe cleaded and bent in a spiral curve instead of in a circular curve;

Fig. 11 is a sectional view showing a spring shoe having a number of points for engagement with the operating arm to permit of the setting up of the device for damping the suspension spring movements in any required degrees in either direction or in both directions of its movement;

Fig. 12 is a fragmentary sectional elevation of the detail of an attachment between the lever on the drum and the suspension spring to be controlled, the link in this case being a flexible metal lath; and Fig. 13 is a fragmentary view suggesting an alternative arrangement for varying the length of the lever by which movement is applied to the device from one of the suspension springs.

Referring to Figs. 1 to 4; the drum 20 is secured to the chassis member 21 by the bolt 24 which also secures the cap hub 23 concentrically in the drum; any one or more of the three tapped holes 22 carries a stud or bolt to further secure the drum 20 non-rotatably to the chassis member 21. The cover lever 26—27 has a socket 25 in a boss or lug 25A; this socket carries the control arm 35 which engages in a hole in the spring shoe 36. The cover lever 26—27 is rotatable upon the hub 23. The control arm 35 which is a loose fit in the socket hole 25 in the sleeve part of the cover is usually engaged loosely in a hole in the spring shoe 36 near one end of it, but might be fixed to the shoe. Another hole 37 is drilled in the spring shoe 36 near the other end of it; by changing the arm 35 from one hole to the other the device is arranged to function clock-wise or anti-clockwise as required. On the outer end of the lever 27 is a boss 28 which is fitted with a rubber bush 29 working in which is a spindle 32 having a head 31 in which one end of an operating rod 30 is fixed. The lower end of this rod is connected to the axle or suspension spring the movements of which are required to be controlled. The other end of the spindle 32 is secured by a washer 34 and castle nut 33.

The operation of the device is as follows:—

When the suspension spring of the vehicle compresses, as when the road wheel crosses an obstruction, the cover lever 26—27 is raised by the thrust of the rod 30 and the spring shoe 36 is "trailed," that is to say it is moved in the opposite direction to the arrow (Fig. 3). This movement is the direction of least frictional resistance, and it produces a negligible resistance to the compression of the suspension spring. On the rebound movement of the suspension spring, the spring shoe 36 is "driven" in the direction of the arrow (Fig. 3) which is the direction of greatest frictional resistance, and consequently an effective check or damping action is then imposed on the rebound movement of the suspension spring.

As the initial frictional resistance between the shoe 36 and the drum 20 (Figs. 3, 9 and 11) permits of the "crowding" or augmentation of the frictional resistance during the operative movement, it will be seen that in one-way devices if the shoe 36 be made spiral as in Fig. 10 and the arm 35 be inserted in the eye 39 which is formed in the "inset" end of the spiral shoe, the spiral shape of the shoe will give additional initial friction between the drum and the shoe and permit of increased "crowding" whether the drum 20 be cylindrical, elliptic or spiral in section, but in the case of elliptic or spiral section drums the "outset" end of the shoe 36 during the operative movement would be driven towards that part of the drum with a diminishing distance between the centre and face of the drum as shown by the arrow in Fig. 9 which also illustrates the position of the device at the extreme end of the compression movement of the suspension spring. In like manner the "crowding" is augmented when an elliptic or circular shoe is operated in a spiral or elliptic drum. Similar augmentation of the "crowding" effect can be obtained in both directions of movement if the drum be elliptic or cylindrical and the shoe be made elliptic.

In Fig. 11 the band is shown with five eyes at different positions. Depending on the particular eye in which the arm 35 is engaged, a damping effect is procured in either or both directions of movement and in the latter case the degree of damping may be varied as desired so that it will be greater or less as required in the case of clockwise or anti-clockwise movement of the axle or suspension spring respectively. If the control arm 35 is engaged in the midposition hole in the spring shoe, then equal damping will be obtained in both directions of the shoe's movement.

Another arrangement for regulating the degree of control is indicated in Figs. 7 and 8. In this case the drum cover 26 has a hump 40 formed on one side of it. A flexible band 41, the bottom end of which is attached to the suspension spring or the axle of the vehicle is carried over the hump 40 and backward around portion of the flange on the drum cover and is terminally secured to the drum cover at 42. If the drum be set up on the chassis frame so that the hump 40 is at the full extension position (see dotted line in Fig. 7) at the commencement of the oscillatory movement which is to be retarded, the minimum damping effect will be applied, whereas, contrariwise, if at that point the band 41 is hanging from the hump face of the flange of the drum cover a greater damping effect will be exercised, as the effective leverage will become shorter as movement progresses. This will be the case for instance when the hump 40 is in the lower dotted line position indicated in Fig. 8. By varying the shape of the hump 40 a wide range of variation in the damping throughout the range of movement can be appropriately arranged.

In the case when the device is fitted to damp movement in both directions the lever 27 must be connected with the suspension spring or the vehicle axle by a rigid member through which tension and compression may be transmitted. But when it is fitted as a one-way device, as for instance to retard the rebound movements of a suspension spring, then the connection may be rigid or means must be provided for rotating the spindle reversely during the compression movements of the suspension spring so that the operating arm 35 will be brought to its zero position when the suspension spring is at full compression. Any appropriate means may be adopted for this purpose, as for instance, a helical spring 50 (see Fig. 7)

anchored back to some fixed portion of the chassis or car structure, or in the case of Fig. 6 a helical spring 51 in compression located between the axle pad and the underside of the lever arm 27; or a spiral spring terminally fixed to the hub 23 and to the cover 26 may be used. A convenient semi-rigid attachment for the lever 27 is indicated in Fig. 12, in which 54 is a flexible steel lath pivotally hung on a bolt 55 which is passed through a socket 56 on the end of the lever 27 and is appropriately fixed at its bottom end to the suspension spring or to the vehicle axle. The pivotal and flexing movement of the lath 54 allows for any relative lateral movement between the parts.

Another device for varying the length of the lever 27 is indicated in Fig. 13. In this case the lever is in the form of a bar 58 which is slidable through and fixable in a socket 59 on the cover 26 by any appropriate means. By adjustment of the position of the bar arm 58 in the socket 59 the leverage length appropriate to the required damping effect is obtained.

Fig. 5 indicates the alternative arrangement in which the damping spring acts externally on the drum hub whilst the drum body rotates about the hub. In this case the hub member 60 is bolted up to the chassis frame member 61 by means of a through bolt 62 secured by a castle nut 63, rotation being prevented by dowels or check pins not shown. The drum body 65 has a bearing at 66 on the hub 60 and the lever arm 67 which is connected to the suspension spring or the axle is riveted to the cover plate 68 which is bolted up to the drum wall 65. The lug 64 by which the spring shoe 70 is moved is a stud screwed through a tapped hole in the drum wall. The spring shoe 70 is shod with asbestos fabric 72 and clasps the cylindrical face 73 of the hub 60. A steady bearing for the drum body on the hub bolt 62 is provided at 77.

Just as augmentation of the self clutching effect of the spring shoe on the drum wall is obtainable by curving the drum wall spirally as seen in Fig. 9, so also in the case of the alternative arrangement in which the damper spring clutches the hub, augmentation of the clutching effect is obtainable by making the hub surface on a spiral curve as seen in Fig. 9 instead of cylindrically as shown in the drawing.

Following the practice of the trade, the drum may be mounted either on the suspension spring or on the axle and the spring shoe connected to the vehicle frame when fitting is convenienced by that arrangement; but in most cases the drum would be fixed on the chassis frame and the spring shoe control connected to the suspension spring or to the axle of the vehicle.

What I claim as my invention and desire to secure by Letters Patent is:—

A device of the character described, including a drum, an interupted spring ring arranged as a shoe in direct frictional engagement with said drum, a control member, and means for connecting the control member at various points on the ring whereby the device may function in a clockwise or counter-clockwise direction.

In testimony whereof I affix my signature.
WILLIAM McNEIL.